(12) United States Patent
Shum et al.

(10) Patent No.: US 10,222,229 B1
(45) Date of Patent: Mar. 5, 2019

(54) AUTONOMOUS FEATURE OPTIMIZATION FOR A CONNECTED VEHICLE BASED ON A NAVIGATION ROUTE

(71) Applicant: TOYOTA JIDOSHA KABUSHIKI KAISHA, Toyota-shi, Aichi-ken (JP)

(72) Inventors: Jonathan Shum, Mountian View, CA (US); BaekGyu Kim, Mountain View, CA (US); Shinichi Shiraishi, Mountain View, CA (US)

( * ) Notice: Subject to any disclaimer, the term of this patent is extended or adjusted under 35 U.S.C. 154(b) by 0 days.

(21) Appl. No.: 15/828,183

(22) Filed: Nov. 30, 2017

(51) Int. Cl.
| | |
|---|---|
| G01C 21/36 | (2006.01) |
| G07C 5/08 | (2006.01) |
| G06F 8/65 | (2018.01) |
| G06F 11/36 | (2006.01) |

(52) U.S. Cl.
CPC ..... G01C 21/3697 (2013.01); G01C 21/3667 (2013.01); G01C 21/3691 (2013.01); G06F 8/65 (2013.01); G07C 5/0841 (2013.01); G06F 11/3692 (2013.01)

(58) Field of Classification Search
USPC .......................................................... 701/25
See application file for complete search history.

(56) References Cited

U.S. PATENT DOCUMENTS

| | | | | |
|---|---|---|---|---|
| 2007/0265759 | A1* | 11/2007 | Salinas | B60T 7/16 701/93 |
| 2017/0067750 | A1* | 3/2017 | Day | G01C 21/3461 |
| 2017/0236210 | A1* | 8/2017 | Kumar | B60W 10/04 705/4 |
| 2017/0329331 | A1* | 11/2017 | Gao | B60W 50/0098 |
| 2017/0356746 | A1* | 12/2017 | Iagnemma | G05D 1/0088 |
| 2017/0356751 | A1* | 12/2017 | Iagnemma | G01C 21/3461 |
| 2018/0216952 | A1* | 8/2018 | Krumm | G01C 21/3492 |

FOREIGN PATENT DOCUMENTS

| | | |
|---|---|---|
| JP | 2013-199249 | 10/2013 |
| JP | 2015206655 | 11/2015 |
| JP | 2016-057655 | 4/2016 |

* cited by examiner

*Primary Examiner* — Tyler D Paige
(74) *Attorney, Agent, or Firm* — Burbage Law, P.C.; Jon-Michael Burbage; Elizabeth Ruzich

(57) ABSTRACT

The disclosure includes embodiments for autonomous feature optimization. In some embodiments, a method includes generating one or more candidate navigation routes for a driver of a vehicle. In some embodiments, the method includes determining a set of autonomous features to be provided by the vehicle for each of the one or more candidate navigation routes. In some embodiments, the method includes determining that the set of autonomous features includes an unsafe autonomous feature that is not safe to use during any part between the start point and the end point of the one or more candidate navigation routes. In some embodiments, the method includes displaying a user interface that includes the one or more candidate navigation routes and corresponding autonomous features that are available for each of the one or more candidate navigation routes, wherein the user interface excludes the unsafe autonomous feature.

25 Claims, 7 Drawing Sheets

AUTONOMOUS FEATURE OPTIMIZATION FOR A CONNECTED VEHICLE BASED ON A NAVIGATION ROUTE

BACKGROUND

The specification relates to autonomous feature optimization for a connected vehicle based on a navigation route.

Vehicles are equipped with numerous autonomous features (sometimes referred to as "ADAS features"). The ADAS features are implemented by Advanced Driver Assistance Systems ("ADAS system" if singular, "ADAS systems" if plural). To operate safely for consumers, these autonomous features are dependent on thorough and accurate real-world testing in a diverse set of road environments. Unfortunately, it is impossible for manufacturers to test their autonomous features in all driving scenarios before they are deployed to consumers in the real-world. This approach is problematic for the following reasons: (1) manufacturers have not actually performed enough real-world testing to know that the autonomous features are actually safe at the time they are released; and (2) manufacturers know that many autonomous features that are released are likely not safe in specific driving conditions that are identifiable based on the vehicle's navigation route.

SUMMARY

Described herein is a method for optimizing autonomous features for a vehicle based on a navigation route. The method may include generating one or more candidate navigation routes for a driver of a vehicle, wherein the one or more candidate navigation routes each include a start point and an end point. The method may further include determining a set of autonomous features to be provided by the vehicle for each of the one or more candidate navigation routes. The method may further include determining that the set of autonomous features includes an unsafe autonomous feature that is not safe to use during any part between the start point and the end point of the one or more candidate navigation routes. The method may further include displaying, on an electronic display, a user interface that includes the one or more candidate navigation routes and corresponding autonomous features that are available for each of the one or more candidate navigation routes, wherein the user interface excludes the unsafe autonomous feature.

In some embodiments, determining that the set of autonomous features includes the unsafe autonomous feature further comprises: identifying real-time data for conditions that occur along each of the one or more candidate navigation routes and determining that the unsafe autonomous feature is unsafe for the one or more candidate navigation routes based on the real-time data. In some embodiments, the one or more candidate navigation routes include a first candidate navigation route and a second candidate navigation route, determining that the unsafe autonomous feature is unsafe for the second candidate navigation route is based on the real-time data for the second candidate navigation route, and the user interface includes (1) the first candidate navigation route associated with the set of autonomous features and (2) the second candidate navigation route associated with a subset of the set of autonomous features that excludes the unsafe autonomous feature. In some embodiments, the method further includes receiving a selected route that is selected from one or more candidate navigation routes and during a journey that corresponds to the selected route: engaging the corresponding autonomous features that are safe to use during the journey and generating an observational log that includes information about one or more of the selected route, a make and model of the vehicle, an enabled autonomous feature, an irregularity of the selected route, and sensor data captured during the journey. In some embodiments, the user interface includes an option for disengaging each autonomous feature in the set of autonomous features that are associated with the selected route. In some embodiments, the method further includes generating an improvement for an autonomous feature in the set of autonomous features based on the observational log. In some embodiments, the method further includes identifying a need for a software patch for an autonomous feature in the set of autonomous features based on the observational log. In some embodiments, the method further includes determining that the driver consistently disengages an autonomous feature in the set of autonomous features based on the observational log and determining that the autonomous feature should be discontinued based on lack of driver interest. In some embodiments, the set of autonomous features includes a new autonomous feature, the new autonomous feature is determined to be safe based on real-world data indicating optimal travel conditions, and the observational log includes details about real-world testing of the new autonomous feature. In some embodiments, the user interface includes a map and an estimated travel time for each of the one or more candidate navigation routes and a reason why the unsafe autonomous feature was excluded. In some embodiments, the vehicle is a highly autonomous vehicle.

A system can comprise an onboard vehicle computer system of a vehicle that includes a non-transitory memory storing computer code which, when executed by the onboard vehicle computer system causes the onboard vehicle computer system to: generate one or more candidate navigation routes for a driver of the vehicle, wherein the one or more candidate navigation routes each include a start point and an end point, determine a set of autonomous features to be provided by the vehicle for each of the one or more candidate navigation routes, determine that the set of autonomous features includes an unsafe autonomous feature that is not safe to use during any part between the start point and the end point of the one or more candidate navigation routes, and display, on an electronic display, a user interface that includes the one or more candidate navigation routes and corresponding autonomous features that are available for each of the one or more candidate navigation routes, wherein the user interface excludes the unsafe autonomous feature.

In some embodiments, the system further includes an autonomous features server that generates autonomous features data describing the set of autonomous features, and where the onboard vehicle computer system determines that the set of autonomous features includes the unsafe autonomous feature based on the autonomous features data. In some embodiments, generating the autonomous features data comprises identifying real-time data for conditions that occur along each of the one or more candidate navigation routes and generating the autonomous features data based on the real-time data. In some embodiments, the one or more candidate navigation routes include a first candidate navigation route and a second candidate navigation route, determining that the unsafe autonomous feature is unsafe for the second candidate navigation route is based on the real-time data for the second candidate navigation route, and the user interface includes (1) the first candidate navigation route associated with the set of autonomous features and (2) the second candidate navigation route associated with a subset of the set of autonomous features that excludes the unsafe autonomous feature. In some embodiments, the system includes computer code that further causes the onboard vehicle computer system to: receive a selected route that is selected from one or more candidate navigation routes and during a journey that corresponds to the selected route: engage the corresponding autonomous features that are safe to use during the journey and generate an observational log that includes information about one or more of the selected route, a make and model of the vehicle, an enabled autonomous feature, an irregularity of the selected route, and sensor data captured during the journey.

In some embodiments, a method includes receiving navigation route data from a vehicle that describes candidate navigation routes that each include a start point and an end point, determining autonomous features data that describe a set of autonomous features to be provided by the vehicle for the candidate navigation routes, where the set of autonomous features includes an unsafe autonomous feature that is not safe to use during any part between the start point and the end point of one or more of the candidate navigation routes, providing the autonomous features data to the vehicle, and receiving observational log data from the vehicle that includes information about one or more of a make and model of the vehicle, a selected route, a success or failure of each enabled autonomous feature, an irregularity of the selected route, and a journey associated with the selected route.

In some embodiments, a classifier is used to determine the autonomous features data and further comprising updating the classifier based on the observational log data. In some embodiments, additional operations may include receiving real-time data for conditions that occur along each of the candidate navigation routes, where determining the autonomous features data is further based on the real-time data where the real-time data includes one or more of weather data, traffic accident data, navigation route data, and construction data. In some embodiments, the candidate navigation routes include a first candidate navigation route and a second candidate navigation route, determining that the unsafe autonomous feature is unsafe for the second candidate navigation route is based on the real-time data for the second candidate navigation route, and the vehicle provides a driver of the vehicle with a user interface that includes (1) the first candidate navigation route associated with the set of autonomous features and (2) the second candidate navigation route associated with a subset of the set of autonomous features that excludes the unsafe autonomous feature. In some embodiments, determining the autonomous features data is based on an autonomous features data structure that includes features data that describe, for each autonomous feature included in the vehicle: (1) each driving scenario that has been certified for using accurate real-world testing; and (2) any driving scenarios that are known to be unsafe or likely to be unsafe.

The specification describes a navigation system that solves the problem of unsafe autonomous features by using a navigation application that is stored both in a vehicle and a cloud server. The navigation application determines a candidate navigation route and a set of autonomous features that are safe for the candidate navigation route. The navigation application disengages any unsafe autonomous features that are unsafe for the vehicle's selected navigation route. The navigation application also generates an observational log that describes the operation of the autonomous features in the real-world, thereby serving as a source for real-world testing data that can be used to (1) improve the operation of the autonomous features; (2) remove unused autonomous features; and (3) develop new autonomous features.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
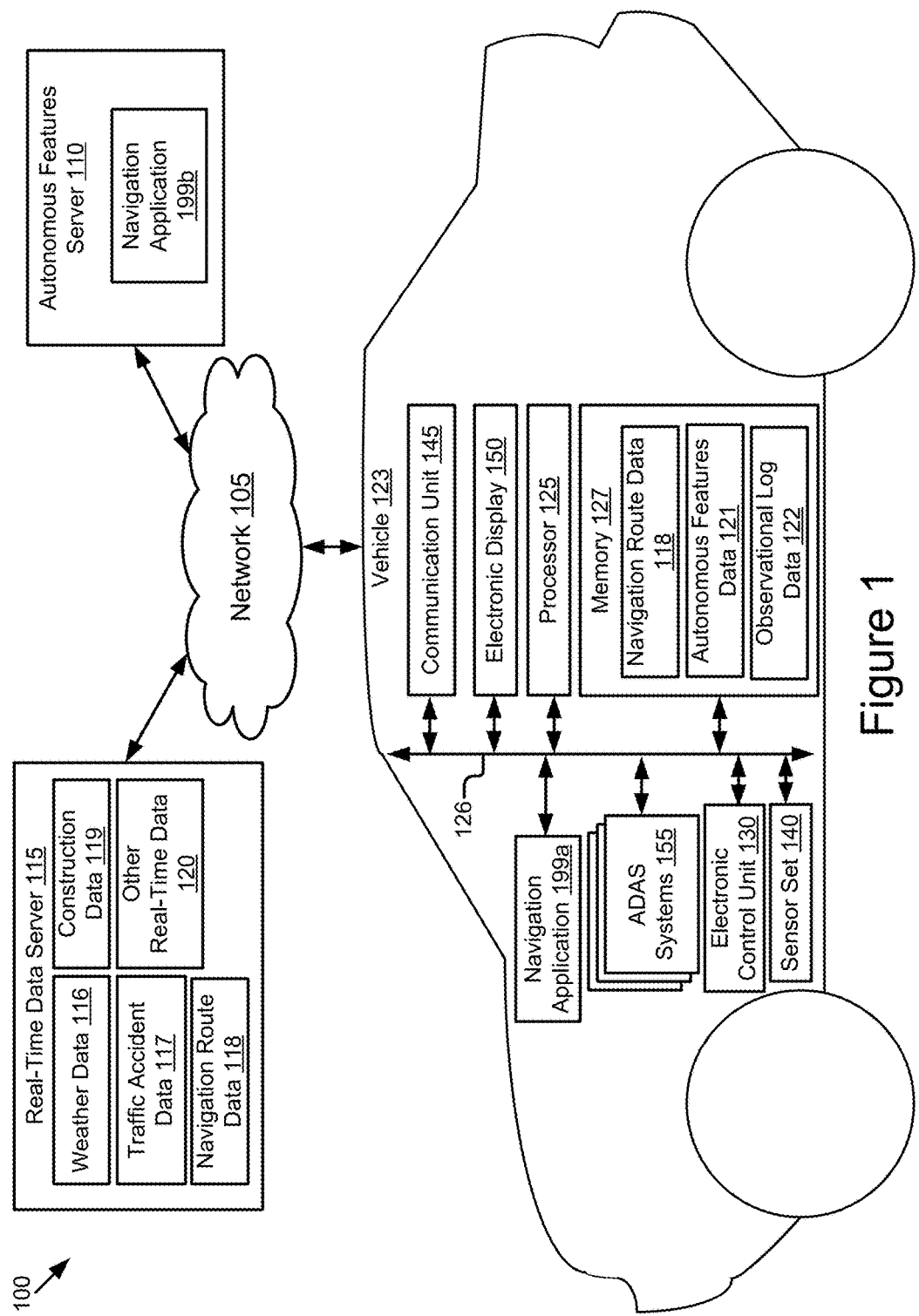
FIG. 1 is a block diagram illustrating an operating environment for a navigation system according to some embodiments.

Modern vehicles are equipped with numerous autonomous features (sometimes referred to as "ADAS features"). To operate safely for consumers, these autonomous features are dependent on thorough and accurate real-world testing in a d set of driving scenarios. Unfortunately, experience shows that it is impossible for vehicle manufacturers to test their autonomous features in all driving scenarios before they are deployed to consumers in the real-world. As a result, the current approach applied by some manufacturers is that vehicles are sold to consumers with their autonomous features enabled even though these autonomous features have thoroughly tested in each of the driving scenarios that they will experience. This may result in the deployment of autonomous features that are unsafe, which can result in accidents and physical harm to the driver.

Described below is a navigation application in a vehicle that wirelessly communicates with a server to disengage any autonomous features that are unsafe for the vehicle's route of travel. In some embodiments, the navigation application generates candidate navigation routes for a driver of a vehicle. The candidate navigation routes may differ based on a preference for minimal time travel, minimal highway usage, minimal distance, etc.

The navigation application may determine a set of autonomous features to be provided by the vehicle for each of the candidate navigation routes. For example, the set of autonomous features may include adaptive cruise control, lane keep assist, collision avoidance, automatic parking, autopilot, sign recognition, and sign assist. The navigation application may determine that one of the autonomous features is an unsafe autonomous feature for one of the candidate navigation routes. For example, the navigation application may determine that lane keep assist is unsafe to use for a candidate navigation route that includes construction because the construction may make it difficult to determine the lane boundaries and therefore make the lane keep assist ineffectual or even dangerous.

The navigation application may generate a user interface that is displayed on an electronic display that includes the candidate navigation routes and corresponding autonomous features that are available for each of the one or more candidate navigation routes. The user interface excludes the autonomous feature that was determined to be unsafe. In some embodiments, the autonomous features listed for each of the candidate navigation routes are different because the unsafe autonomous feature is only unsafe for one of the candidate navigation routes. The user interface may include a reason why the unsafe autonomous feature was excluded.

In some embodiments, the navigation application receives a selected route that is selected from the one or more candidate navigation routes. During a journey that corresponds to the selected route, the navigation application engages the autonomous features that are safe to use during the journey and generates an observational log. The observational log describes the operation of the autonomous features in the real-world. For example, the observational log may include the selected route, a make and model of the vehicle, an enabled autonomous feature, an irregularity of the route, and sensor data captured during the journey. In some embodiments, the navigation application of the vehicle transmits the observational log to a navigation application of an autonomous features server.

The navigation application may use the observational log as a source for real-world testing data that can be used by manufacturers who work on developing and improving the operation of the autonomous features. In some embodiments, the navigation application of the autonomous features server receives observational logs from multiple vehicles and uses the observational logs to improve the set of autonomous features. For example, the navigation application may generate an improvement for one of the autonomous features. In another example, the navigation application may identify a need for a software patch for one of the autonomous features. In yet another example, the navigation application may determine that the driver consistently disengages one of the autonomous features. As a result, the navigation application may determine that the autonomous feature should be discontinued based on lack of driver interest.

Example System

Referring to FIG. 1, an operating environment 100 for a navigation application 199 is illustrated according to some embodiments. As depicted, the operating environment 100 includes the following elements: a vehicle 123, an autonomous features server 110, and a real-time data server 115. These elements are communicatively coupled to one another by a network 105.

In FIG. 1 and the remaining figures, a letter after a reference number, e.g., "199*a*," represents a reference to the element having that particular reference number. A reference number in the text without a following letter, e.g., "191," represents a general reference to embodiments of the element bearing that reference number.

Although one vehicle 123, one autonomous features server 110, one real-time data server 115, and one network 105 are depicted in FIG. 1, in practice the operating environment 100 may include one or more vehicles 123, one or more autonomous features server 110, one or more real-time data servers 115, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, Dedicated Short Range Communication (DSRC), full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

The vehicle 123 is any type of vehicle with an onboard vehicle computer and a communication unit that is equipped with internet access. In this way, the vehicle 123 is a connected vehicle. The vehicle 123 may be one of the following types of vehicles: a car; a truck; a sports utility vehicle; a bus; a semi-truck; a drone; or any other roadway-based conveyance. The vehicle 123 may access the network 105 via any of the communication methods described above.

In some embodiments, the vehicle 123 includes the following elements: a processor 125, a memory 127, a sensor set 140, an electronic control unit 130, a communication unit 145, an electronic display 150, ADAS systems 155, and a navigation application 199*a*. Each of the elements communicate via a bus 126.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The vehicle 123 may include one or more memories 127.

The memory 127 of the vehicle 123 stores one or more of the following types of digital data: navigation route data 118, autonomous features data 121, and observational log data 122. In some embodiments, the memory 127 stores any data that is necessary for the navigation application 199 to provide its functionality.

The navigation route data 118 describes one or more candidate navigation routes that include a start point and an end point. In some embodiments, the navigation application 199a of the vehicle 123 receives a request from a user for candidate navigation routes where the request includes a start point and an end point. The navigation application 199a may query a real-time data server 115, such as a server that provides driving directions, for navigation route data 118 that corresponds to candidate navigation routes that include the start point and the end point. The real-time data server 115 transmits the navigation route data 118 to the vehicle 123 via the wireless network and the communication unit 145 stores the navigation route data 118 in the memory 127 of the vehicle 123.

The autonomous features data 121 describes, for each candidate navigation route described by the navigation route data 118, which autonomous features are safe for the driver of the vehicle 123 to use. The navigation application 199a may receive the autonomous features data 121 from the navigation application 199b stored on the autonomous features server 110 or the navigation application 199a may generate the autonomous features data 121 itself. In instances where the navigation application 199a generates the autonomous features data 121 itself, the navigation application 199a may use any combination of weather data 116, traffic accident data 117, construction data 119, or other real-time data 120 to determine the conditions along the candidate navigation routes to determine whether any of the autonomous features are unsafe and generate the autonomous features data 121 based on that determination.

The observational log data 122 describes the operation of the autonomous features in the real-world during a journey. For example, the observational log data 122 may include a selected route, a make and model of the vehicle 123, an enabled autonomous feature, an irregularity of the route, and sensor data captured during the journey.

In some embodiments, the processor 125 and the memory 127 may be elements of the onboard vehicle computer system (such as the computer system 200 described below with reference to FIG. 2). The onboard vehicle computer system may be operable to cause or control the operation of the navigation application 199a. The onboard vehicle computer system may be operable to access and execute the data stored on the memory 127 to provide the functionality described herein for the navigation application 199 or its elements (see, e.g., FIG. 2). The onboard vehicle computer system may be operable to execute the navigation application 199, which causes the onboard vehicle computer system to execute one or more of the steps of the method 600 described below with reference to FIG. 6.

In some embodiments, the processor 125 and the memory 127 may be elements of an onboard unit. The onboard unit includes an onboard vehicle computer system that may be operable to cause or control the operation of the navigation application 199. The onboard unit may be operable to access and execute the data stored on the memory 127 to provide the functionality described herein for the navigation application 199 or its elements. The onboard unit may be operable to execute the navigation application 199 which causes the onboard unit to execute one or more of the steps of the method 600 described below with reference to FIG. 6. In some embodiments, the computer system 200 depicted in FIG. 2 is an example of an onboard unit.

The electronic control unit 130 (herein "ECU") controls the operation of the ADAS systems 155 of the vehicle 123. The ECU may, responsive to instructions received from the navigation application 199, deactivate any unsafe and/or unselected autonomous features for the duration of a journey controlled by the ADAS systems 155. In this way, the navigation application 199 controls whether individual ADAS systems 155 of the vehicle 123 are activated or enabled so that they can be activated for a given navigation route.

The sensor set 140 may include any sensors in the vehicle 123 that generate sensor data during a journey. For example, the sensor set 140 may include short-range sensors and long-range sensors. In some embodiments, the sensor set 140 of the vehicle 123 may include one or more of the following vehicle sensors: a camera; a LIDAR sensor; an ultrasonic sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The navigation application 199a may incorporate the sensor data into the observational log data 122 stored in the memory 127.

The communication unit 145 transmits and receives data to and from the network 105 or to another communication channel. In some embodiments, the communication unit 145 may include a DSRC transceiver, a DSRC receiver and other hardware or software necessary to make the vehicle 123 a DSRC-equipped device.

In some embodiments, the communication unit 145 includes a wireless transceiver for exchanging data with the network 105 or other communication channels using one or more wireless communication methods, including: IEEE 802.11; IEEE 802.16, Bluetooth®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The electronic display 150 may be a touch-sensitive electronic display 150 that is an element of a head-unit or infotainment system of the vehicle 123 (the head-unit and the infotainment system are not pictured in FIG. 1, but are standard elements of a modern connected vehicle). A driver of the vehicle 123 can provide user inputs by touching graphical buttons displayed by the electronic display 150 or, if the vehicle includes an electronic assistant, by speaking to a microphone that is an element of the head-unit or infotainment system of the vehicle 123. For example, the driver can interact with the navigation application 199a of the vehicle 123 using the electronic display 150 to touch the electronic display 150 and select a navigation route for use on a journey.

The ADAS systems 155 provide the autonomous features to the vehicle 123. In some embodiments, the vehicle 123 is an autonomous vehicle, a semi-autonomous vehicle, or a highly autonomous vehicle (HAV). For example, the vehicle 123 includes a set of ADAS systems 155 that provide autonomous features to the vehicle 123, which are sufficient to render the vehicle 123 an autonomous vehicle.

The ADAS systems 155 may include one or more of the following elements: an automatic cruise control (ACC) system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a lane keep assistant); a pedestrian protection system; a traffic sign recognition system; a turning assistant; a wrong-way driving warning system; autopilot; sign recognition; and sign assist. Each of these example ADAS systems 155 provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, the navigation application 199a includes code and routines that are operable, when executed by the processor 125, to cause the processor 125 to execute one or more of the steps of the method 600 described below with reference to FIG. 6. In some embodiments, the navigation application 199a of the vehicle 123 and the navigation application 199b of the autonomous features server 110 each implement some of the steps of the method 600 described below with reference to FIG. 6. For example, the navigation application 199a may receive a request from a driver for one or more candidate navigation routes that include driving directions. The navigation application 199a may generate the candidate navigation routes, receive data from the real-time data server 115, etc. The navigation application 199a may transmit navigation route data 118 that includes the one or more candidate navigation routes to the autonomous features server 110 to obtain autonomous features data 121 that corresponds to each of the one or more candidate navigation routes. The navigation application 199a may generate a user interface that includes information about the one or more candidate navigation routes and the autonomous features on the electronic display 150. The navigation application 199a may determine that one of the autonomous features is an unsafe autonomous feature and exclude the unsafe autonomous feature from the user interface.

Once the navigation application 199a receives a selected route from the driver, the navigation application 199a may instruct the electronic control unit 130 to implement the autonomous features provided by the ADAS systems 155 and generate an observational log during a journey that corresponds to the selected route that describes information about the journey.

In some embodiments, the navigation application 199a of the vehicle 123 may be implemented using hardware including a field-programmable gate array ("FPGA") or an application-specific integrated circuit ("ASIC"). In some other embodiments, the navigation application 199a may be implemented using a combination of hardware and software.

The autonomous features server 110 may include a processor based computing device. For example, the computing device may include a standalone hardware server. In some implementations, the autonomous features server 110 may be communicatively coupled to the network 105. The autonomous features server 110 may include network communication capabilities. The autonomous features server 110 may be operable to send and receive wireless messages via the network 105. For example, the computing device may include a communication unit (such as described below with reference to the communication unit 145 of FIG. 2). The computing device may be operable to send and receive DSRC messages, basic safety messages (BSM), full-duplex wireless messages or any other wireless message.

The autonomous features server 110 may include a navigation application 199b that performs some of the steps for determining an unsafe autonomous feature. For example, the navigation application 199b may receive navigation route data 118 from the vehicle 123 that describes a start point and an end point for one or more candidate navigation routes. The navigation application 199b may include an autonomous features data structure (not illustrated). The navigation application 199b may query the autonomous features data structure with the navigation route data 118 and receive autonomous features data 121 for the one or more candidate navigation routes described by the navigation route data 118. The navigation application 199b may transmit the autonomous features data 121 to the navigation application 199a of the vehicle 123. This embodiment is described in greater detail below with reference to FIG. 3. In some embodiments, the navigation application 199b performs the method 700 of FIG. 7 as described in greater detail below.

After the vehicle 123 has completed a journey, the navigation application 199b may receive observational log data 122 from the vehicle 123 that includes information about one or more of the selected route, a success of the journey, a make and model of the vehicle, an enabled autonomous feature, an irregularity of the selected route, and sensor data captured during the journey. In some embodiments, the navigation application 199b receives observational log data 122 from multiple vehicles 123. The navigation application 199b may aggregate the observation log data 122 and update a classifier that is used to generate autonomous features data 121 including, for example, an identification of unsafe autonomous features.

The real-time data server 115 may include a processor based computing device. For example, the computing device may include a standalone hardware server. In some implementations, the real-time data server 115 may be communicatively coupled to the network 105. The real-time data server 115 may include network communication capabilities. The real-time data server 115 may be operable to send and receive wireless messages via the network 105.

The real-time data server 115 may include one or more of weather data 116, traffic accident data 117, navigation route data 118, construction data 119, and other real-time data 120. In some embodiments, the real-time data server 115 includes multiple real-time data servers 115 where each real-time data server 115 includes one of the types of data. The weather data 116 may describe the current weather conditions for a specified geographical location, such as a particular portion of a roadway for a candidate navigation route. The traffic accident data 117 may describe traffic accidents present at a specific geographic location of a roadway. The navigation route data 118 may describe candidate navigation routes for travelling between a start point and an end point. The navigation route data 118 may include information about travel time, distance, landmarks alone the candidate navigation routes, etc. The construction data 119 describes construction being performed along a roadway at a specified geographic location. The other real-time data describes information that is relevant to determining a traffic scenario that an autonomous feature will have to experience for a candidate navigation route.

The real-time data server 115 generates and provides data that may be useful for determining navigation routes and conditions associated with the navigation routes. For example, the real-time data server 115 may receive a request from the navigation application 199a of the vehicle 123 that includes a start and end point. The real-time data server 115 may provide the navigation application 199a with navigation route data 118 that describes candidate navigation routes. In another example, the real-time data server 115 may receive a request from the navigation application 199b of the autonomous features server 110 for information about conditions that correspond to a candidate navigation route. The real-time data server 115 may provide the navigation application 199b with weather data 116, traffic accident data 117, construction data 119, or other real-time data 120, which the navigation application 199b uses to determine the conditions associated with a candidate navigation route that may be problematic for an autonomous feature provided by the vehicle 123.

Embodiments of the navigation application 199 are described in more detail below with reference to FIGS. 2, 3A, 3B, 4, 5, and 6.

Example Computer System

Figure 2:
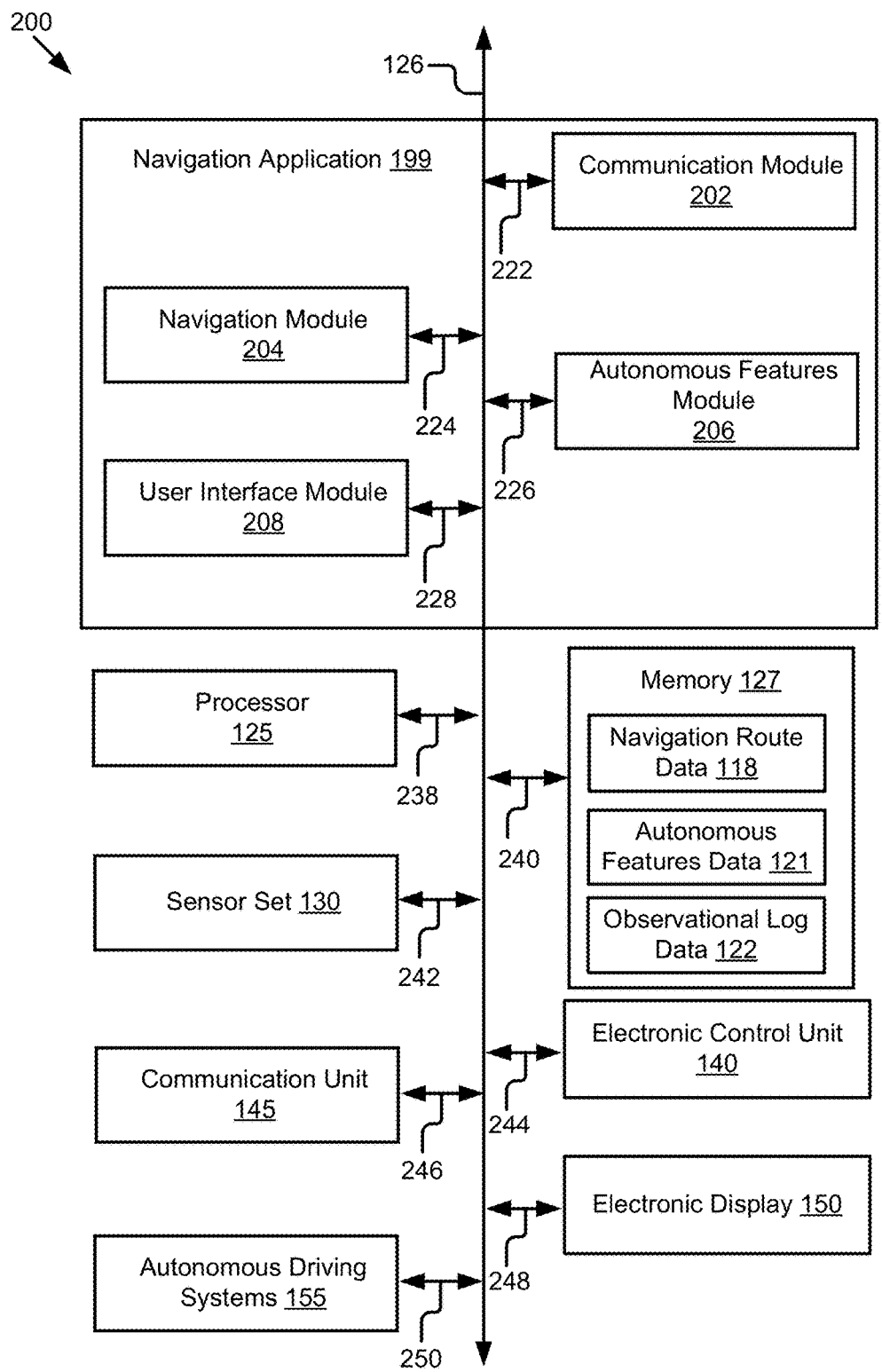
FIG. 2 is a block diagram illustrating an example computer system that includes a navigation application according to some embodiments.

Referring now to FIG. 2, depicted is a block diagram illustrating an example computer system 200 including the navigation application 199 of the vehicle 123 and/or the autonomous features server 110 of FIG. 1 according to some embodiments.

In some embodiments, the computer system 200 may include a special-purpose computer system that is programmed to perform one or more steps of a method 600 described below with reference to FIG. 6

In some embodiments, the computer system 200 is an onboard vehicle computer of the vehicle 123 of FIG. 1. In some embodiments, the computer system 200 is an ECU, head unit or some other processor-based computing device of the vehicle 123 of FIG. 1. In some embodiments, the computer system 200 is the autonomous features server 110 of FIG. 1. In some embodiments, the computer system 200 is part the onboard vehicle computer of the vehicle 123 and in part the autonomous features server 110 of FIG. 1.

The computer system 200 may include one or more of the following elements according to some examples: the navigation application 199; the processor 125; the memory 127; the sensor set 140; the electronic control unit 130; the communication unit 145; the electronic display 150; and the ADAS systems 155. The components of the computer system 200 are communicatively coupled by a bus 126.

In the illustrated embodiment, the processor 125 is communicatively coupled to the bus 126 via signal line 238. The memory 127 is communicatively coupled to the bus 126 via signal line 240. The sensor set 140 is communicatively coupled to the bus 126 via signal line 242. The electronic control unit is communicatively coupled to the bus 126 via signal line 244. The communication unit 145 is communicatively coupled to the bus 126 via signal line 246. The electronic display is communicatively coupled to the bus 126 via signal line 248. The ADAS systems 155 are communicatively coupled to the bus 126 via signal line 250.

The following elements of the computer system 200 were described above with reference to FIG. 1, and so, those descriptions will not be repeated here: the processor 125; the memory 127; the sensor set 140; the electronic control unit 130; the communication unit 145; the electronic display 150; and the ADAS systems 155.

The memory 127 may store any of the data described above with reference to FIG. 1. The memory 127 may store any data needed for the computer system 200 to provide its functionality.

As illustrated, the memory 127 stores: the navigation route data 118, the autonomous features data 121, and the observational log data 122. The memory 127 may also store sensor data generated by the sensor set 140. These elements were described above with reference to FIG. 1, and so, their descriptions will not be repeated here.

The navigation application 199, as described in greater detail below, generates candidate navigation routes, determines a set of autonomous features, determines that the set of autonomous features includes an unsafe autonomous feature, and generates a user interface that includes the candidate navigation routes and corresponding autonomous features and excludes the unsafe autonomous feature.

In the illustrated embodiment shown in FIG. 2, the navigation application 199 includes a communication module 202, a navigation module 204, an autonomous features module 206, and a user interface module 208.

The communication module 202 can be software including routines for handling communications between the navigation application 199 and other components of the computer system 200 or one or more of the operating environment 100 of FIG. 1. In some embodiments, the communication module 202 can be a set of instructions executable by the processor 125 to provide the functionality described below for handling communications between the navigation application 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, a query for navigation route data 118 to the real-time data server 115 and a query for autonomous features data 121 to the autonomous features server 110. The communication module 202 may send or receive any of the data described above with reference to FIG. 1, or below with reference to FIG. 6, via the communication unit 145.

In some embodiments, the communication module 202 receives data from components of the navigation application 199 and stores the data in the memory 127 (or a buffer or cache of the memory 127). For example, the communication module 202 receives navigation route data 118 from the real-time data server 115 and autonomous features data 121 from the autonomous features server 110 and stores the navigation route data 118 and the autonomous features data 121 in the memory 127 (or a buffer or cache of the memory 127).

In some embodiments, the communication module 202 may handle communications between components of the navigation application 199 and the computer system 200. For example, the communication module 202 may transmit sensor data generated by the sensor set 140 to the autonomous features module 206 for use in generating the observational log data 122. In some embodiments, the communication module 202 may handle communications between components of the navigation application 199. For example, the communication module 202 transmits navigation route data 118 from the navigation module 204 to the autonomous features module 206.

The navigation module 204 can be software including routines for generating candidate navigation routes for a driver of a vehicle 123. In some embodiments, the navigation module 204 can be a set of instructions executable by the processor 125 which, when executed by the processor 125, cause the processor 125 to execute one or more of the steps of the method 600 described below with reference to FIG. 6. In some embodiments, the navigation module 204 can be stored in the memory 127 of the computer system 200 and can be accessible and executable by the processor 125. The navigation module 204 may be adapted for cooperation and communication with the processor 125 and other components of the computer system 200 via signal line 224.

The navigation module 204 may instruct the user interface module 208 to generate a user interface where the user may request candidate navigation routes. The user interface may include fields where the driver may input a start point and an end point. The start point may be automatically populated by the navigation module 204 with the current location of the vehicle 123.

In some embodiments, the navigation module 204 transmits a request, via the communication unit 145, to the real-time data server 115 for navigation route data 118. The request may include the start point and the end point. The navigation module 204 may receive navigation route data 118 that includes candidate navigation routes and associated information, such as a distance to traverse each of the candidate navigation routes, an estimated time for traversing each of the candidate navigation routes, global positioning system (GPS) coordinates for the roadway traveled by each of the candidate navigation routes, etc. The navigation module 204 may instruct the user interface module 208 to display a user interface that includes the candidate navigation routes. In some embodiments, the navigation module 204 stores the navigation route data 118 in the memory 127 and/or transmits the navigation route data 118 to the autonomous features module 206.

The autonomous features module 206 can be software including routines for determining sets of autonomous features and unsafe autonomous features. In some embodiments, the autonomous features module 206 can be stored in the memory 127 of the computer system 200 and can be accessible and executable by the processor 125. The user autonomous features module 206 may be adapted for cooperation and communication with the processor 125 and other components of the computer system 200 via signal line 226.

In some embodiments, the autonomous features module 206 retrieves the navigation route data 118 from the memory 127 or receives the navigation route data 118 from the navigation module 204. The autonomous features module 206 may use the navigation route data 118 to generate autonomous features data 121. The autonomous features module 206 determines a set of autonomous features to be provided by the vehicle 123 for each of the candidate navigation routes described in the navigation route data 118 based on the autonomous features data 121. For example, the set of autonomous features may include all autonomous features that are implemented by the ADAS systems 155.

The autonomous features module 206 may determine that the set of autonomous features includes an unsafe autonomous feature that is not safe to use during any part between the start point and the end point of one of the candidate navigation routes. In some embodiments, the autonomous features module 206 uses real-time data for conditions that occur along each of the candidate navigation routes to determine that the set of autonomous features includes the unsafe autonomous feature.

The real-time data may include weather data 116, traffic accident data 117, construction data 119, or other real-time data 120 provided by the real-time data server 115. The autonomous features module 206 may transmit the navigation route data 118 that describes the current navigation routes to the real-time data server 115 and the real-time data server 115 may provide the weather data 116, traffic accident data 117, construction data 119, and/or other real-time data 120 that are applicable to the roadways included in the current navigation routes to the autonomous features module 206. In another example, the autonomous features module 206 (or the navigation module 204) may provide a start point and an end point to the real-time data server 115 to receive the weather data 116, traffic accident data 117, navigation route data 118, construction data 119, and/or other real-time data 120 all at once. In yet another example, the autonomous features module 206 may transmit the navigation route data 118 to a real-time data server 115 that specializes in weather to obtain corresponding weather data 116, a real-time data server 115 that specializes in traffic to obtain corresponding traffic accident data 117, a real-time data server 115 that specializes in construction to provide construction data 119, etc.

In some embodiments, the autonomous features module 206 may send a request to autonomous features data structure using the navigation route data 118 to obtain the autonomous features data 121. For example, the autonomous features module 206 may query an autonomous features data structure stored on the autonomous features server 110 or on the vehicle 123. In some embodiments, the request includes the navigation route data 118, data describing the make and model of the vehicle 123; data describing or identifying the ADAS systems 155 installed in the vehicle 123 (e.g., a list of the ADAS systems 155 installed in the vehicle 123 or a vehicle identification number (VIN) that can be used to identify the set of autonomous features available for the vehicle 123); and data describing the current time of day.

Figure 3:
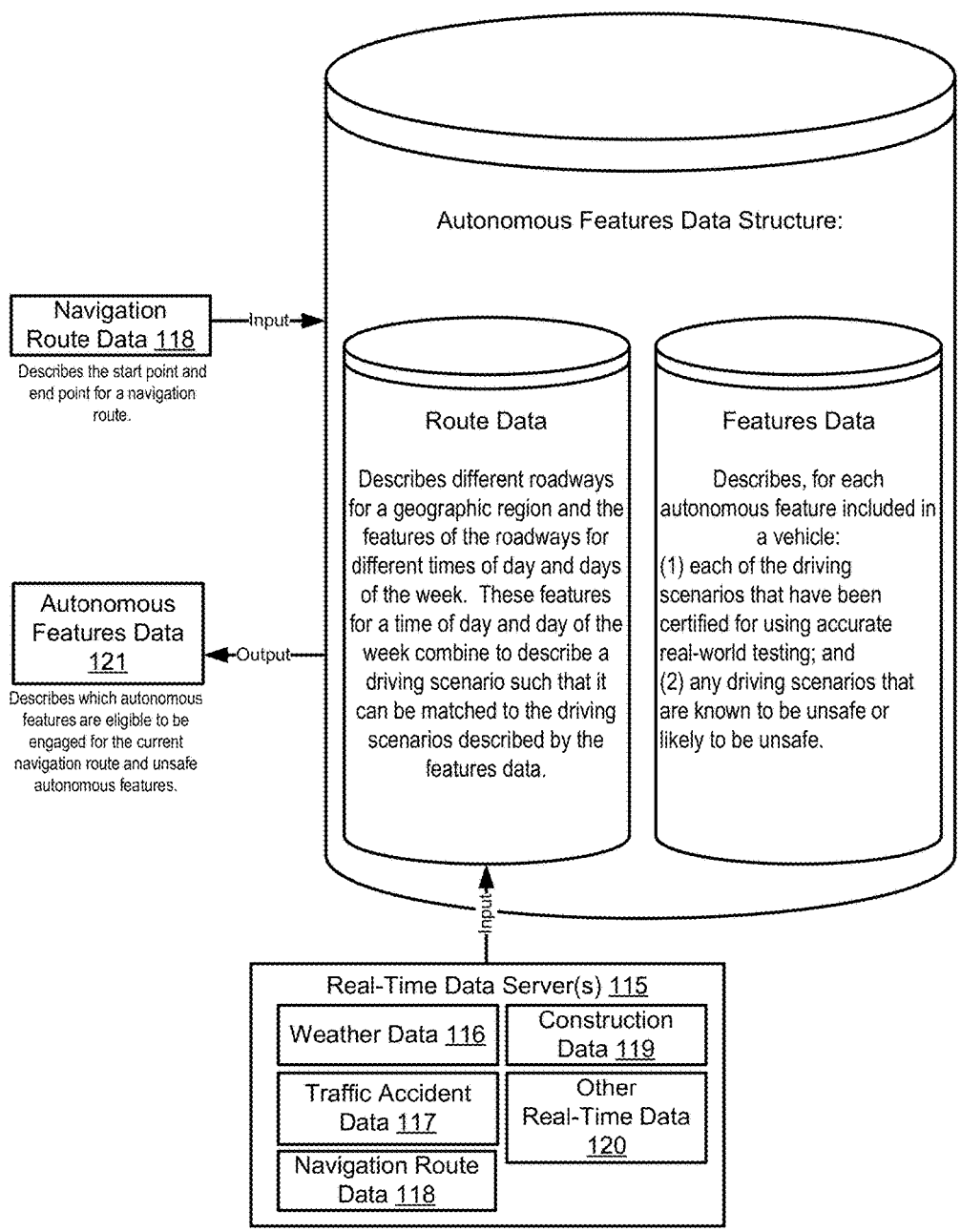
FIG. 3 is a block diagram illustrating an example generation of autonomous features data by the navigation application according to some embodiments.

Turning to FIG. 3, a block diagram illustrates an example generation of autonomous features data by the autonomous features module 206 of the navigation application 199 according to some embodiments. The autonomous features data structure receives a query that includes (1) the navigation route data 118; and (2) data from the real-time data server 115 (or multiple real-time data servers 115) that includes weather data 116, traffic accident data 117, navigation route data 118, construction data 119, and other real-time data 120. The autonomous features data structure may include route data that describe different roadways for a geographic region and the features of these roadways for different times of day and days of the week. These features for a time of day and day of the week combine to describe a driving scenario such that it may be matched to the driving scenarios described by the features data.

The autonomous features data structure may also include features data that describe, for each autonomous feature included in a vehicle: (1) each of the driving scenarios that have been certified for using accurate real-world testing and (2) any driving scenarios that are known to be unsafe or likely to be unsafe. The autonomous features data structure may output autonomous features data 121 that describes which autonomous features are eligible to be engaged for the current navigation route and unsafe autonomous features. In embodiments where the autonomous features data structure is stored on the autonomous features server 110, the autonomous features server 110 transmits the autonomous features data 121 to the autonomous features module 206 of the vehicle 123.

The autonomous features module 206 may determine that a set of autonomous features includes an unsafe autonomous feature that is not safe to using during any part between the start point and the end point of the candidate navigation routes based on identifying, from the autonomous features data 121, each of the driving scenarios that have been certified for using accurate real-world testing and any driving scenarios that are known to be unsafe or likely to be unsafe. For example, the autonomous features data 121 might indicate that adaptive cruise control is unsafe for a candidate navigation route that includes a construction zone because the ADAS systems 155 may have difficulty implementing the adaptive cruise control during the frequent stopping and starting that is associated with a construction zone. In another example, the autonomous features data 121 might indicate that automatic parking is unsafe for a candidate navigation route that takes place at night in rainy weather because it might be difficult for the ADAS systems 155 to detect the lanes because of glare from headlights on a wet surface. In some embodiments, the autonomous features module 206 uses a classifier to determine that the set of autonomous features includes the unsafe autonomous feature. The classifier may use artificial intelligence and/or machine learning.

In some embodiments, the autonomous features module 206 may determine that the set of autonomous features include the unsafe autonomous feature based on insufficient data about the candidate navigation routes. For example, a candidate navigation route may include an area for which there is limited real-time data because it involves an unmapped area, off roading, etc. In another example, the autonomous features module 206 may not have access to the real-time data because of an issue with the real-time data server 115.

Once the autonomous features module 206 determines the set of autonomous features to be provided and any unsafe autonomous features, the autonomous features module 206 instructs the user interface module 208 to generate a user interface that includes the candidate navigation routes and corresponding autonomous features that are available for each of the candidate navigation routes. The autonomous features module 206 excludes any unsafe autonomous features from being offered. As a result, the autonomous features may differ for each of the candidate navigation routes. For example, the user interface may include a first candidate navigation route with the set of autonomous features and a second candidate navigation route with a subset of the set of autonomous features that excludes the unsafe autonomous feature. The electronic display 150 of the vehicle may display the user interface.

Figure 4A:
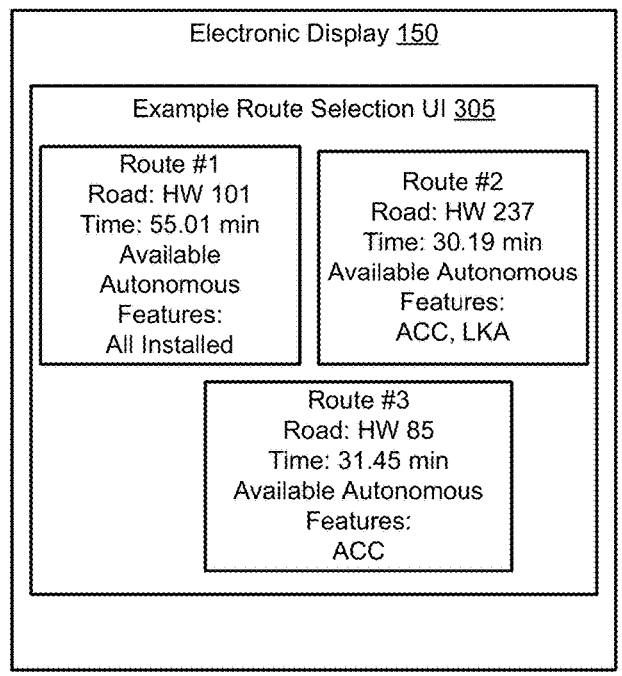
FIG. 4A is a block diagram illustrating an example route selection user interface that includes candidate navigation routes and available autonomous features according to some embodiments.

FIG. 4A is a block diagram 300 illustrating an example route selection user interface 305 that is displayed on the electronic display 150 according to some embodiments. The user interface 305 includes candidate navigation routes and available autonomous features. In this example, the user interface 305 includes three candidate navigation routes (Route #1, Route #2, and Route #3). The candidate navigation routes each list the main road used, the estimated travel time, and autonomous features that are available. Specifically, the first candidate navigation route offers all autonomous features, the second candidate navigation route offers adaptive cruise control, and lane keep assist, and the third candidate navigation route offers only adaptive cruise control.

Figure 4B:
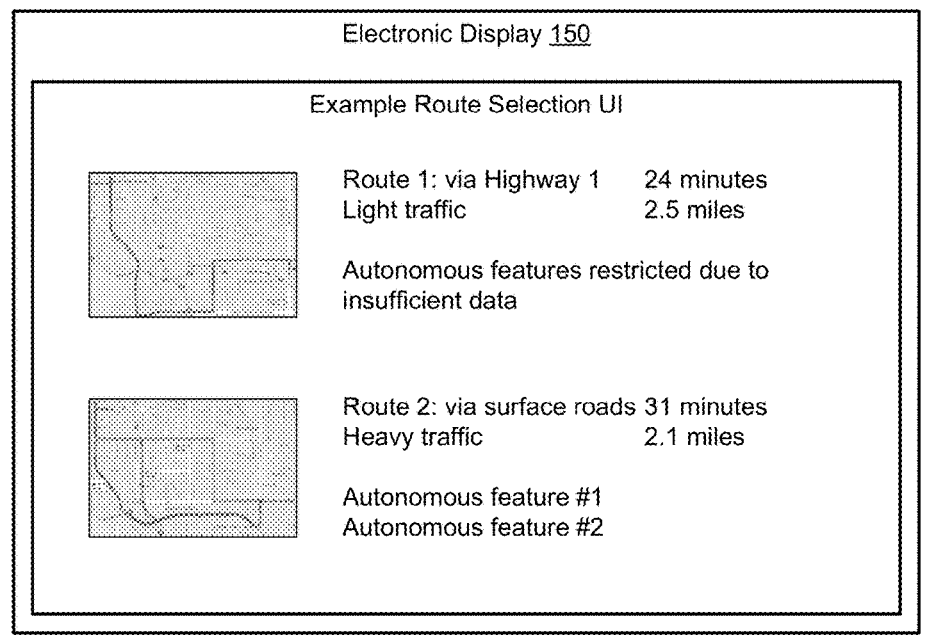
FIG. 4B is a block diagram illustrating an example route selection user interface that includes candidate navigation routes, available autonomous features, and a reason why some autonomous features were restricted according to some embodiments.

FIG. 4B is a block diagram 350 illustrating an example route selection user interface that includes candidate navigation routes, available autonomous features, and a reason why some autonomous features were restricted according to some embodiments. The user interface includes two candidate navigation routes (Route 1 and Route 2). Each candidate navigation route includes a map, a description of the route, a description of the traffic on the route, the travel time, and the distance of each route. The user interface also includes a reason why the unsafe autonomous feature was excluded. In this example the autonomous features were restricted from the first candidate navigation route because there is insufficient data to determine whether it would be safe to use the autonomous features. The second candidate navigation route includes a list of two autonomous features that are available.

In some embodiments, the autonomous features module 206 may allow the set of autonomous features to include a new autonomous feature that would benefit from real-world testing. For example, the new autonomous feature may be a modification to pre-existing autonomous features, such as a new type of lane keep assist, or a completely new autonomous feature. The autonomous features module 206 may determine that the new autonomous feature is safe based on real-world data indicating optimal travel conditions. For example, weather data 116 may indicate that it is a sunny day with no clouds or rain expected, the traffic accident data 117 indicates that there are no accidents along the candidate navigation route, and the construction data 119 indicates that there is no construction along the candidate navigation route. In some embodiments, the autonomous features module 206 determines that the new autonomous feature is safe to deploy in a restricted environment where there is no risk that a driver may misuse the new autonomous feature in an environment that is inappropriate based on the design specification for the new autonomous feature. In some embodiments, the navigation application 199b of the autonomous features server 110 instructs the autonomous features module 206 to engage the new autonomous feature.

The driver may select one of the candidate navigation routes from the user interface. Once the autonomous features module 206 receives the selected route that is selected from the candidate navigation routes, the autonomous features module 206 may instruct the user interface module 208 to generate a user interface that includes a list of the autonomous features that are available for the selected route. The user interface may include an option for disengaging each autonomous feature in the set of autonomous features that are associated with the selected route.

Figure 5:
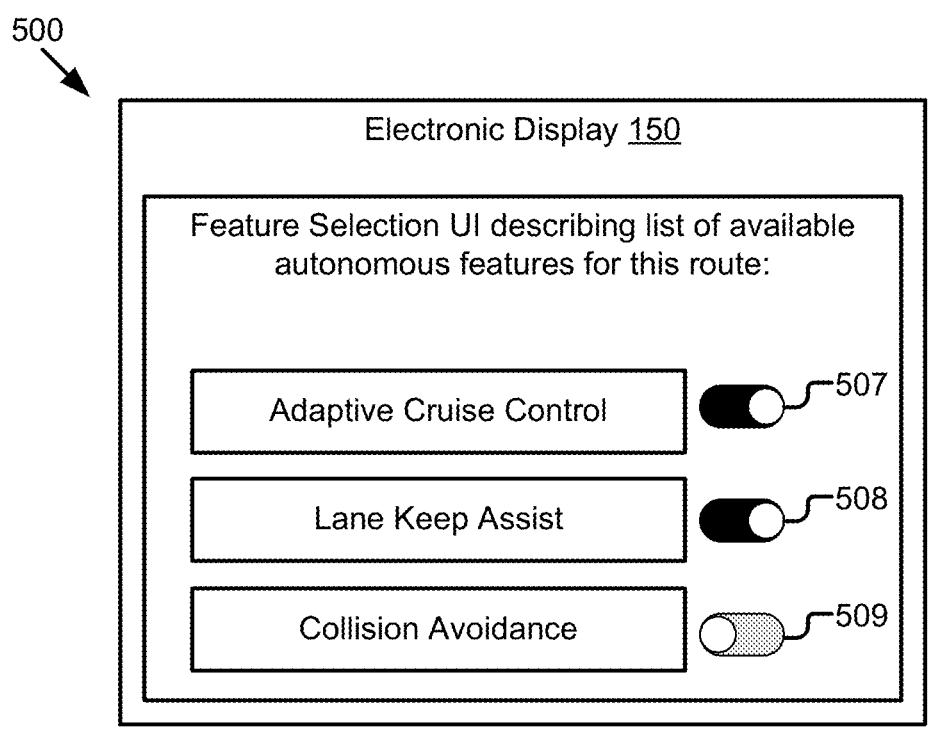
FIG. 5 is a block diagram illustrating a feature selection user interface that describes a list of available autonomous features for a selected route according to some embodiments.

Turning to FIG. 5, a block diagram 500 illustrates a feature selection user interface that describes a list of available autonomous features for a selected route according to some embodiments. In this example, the selected route includes three available autonomous features: adaptive cruise control, lane keep assist, and collision avoidance. Each autonomous feature has a radio button 507, 508, 509 next to it that the driver can use to keep the autonomous features engaged or disengage the autonomous features. The driver may engage or disengage the autonomous features by pressing on the radio buttons. In this example, the radio button 509 for collision avoidance was disengaged. While radio buttons are illustrated, other graphical buttons for selecting and deselecting autonomous features are possible.

During the journey associated with the selected route, the autonomous features module 206 generates an observational log that includes information about real-world testing of the autonomous features. For example, the observational log may include a make and model of the vehicle 123; the enabled autonomous features; information about the selected route, such as navigation route data 118 that includes waypoints, trajectory, etc.; a success of the route, such as true/false or success/failure; irregularities of the route, such as a construction event, excessive acceleration, disengagement of an autonomous feature during the journey, whether there were problems with the road, or other features of the selected route that were adverse to the correct operation of the autonomous features; and sensor data captured during the journey, such as sensor data generated by lidar, a camera, radar, etc. The sensor data is data generated by the sensor set 140 during the journey. For example, the sensor set 140 may include an external facing camera that captures images of road conditions, an internal facing camera that captures images of the driver's reaction during the journey, tire pressure for the tires, fluid levels, etc.

During the journey associated with the selected route, the autonomous features module 206 generates an observational log that includes information about real-world testing of the autonomous features. For example, the observational log may include a make and model of the vehicle 123; the enabled autonomous features; information about the selected route, such as the navigation route data 118; irregularities of the route, such as whether there were problems with the road or other features of the route that were adverse to the correct operation of the autonomous features; how the autonomous features performed during the journey including successes and failures; and sensor data captured during the journey. The sensor data is data generated by the sensor set 140 during the journey. For example, the sensor set 140 may include an external facing camera that captures images of road conditions, an internal facing camera that captures images of the driver's reaction during the journey, tire pressure for the tires, fluid levels, etc.

When the journey ends, the autonomous features module 206 may instruct the electronic control unit 130 to reactivate all autonomous features that were deactivated during the journey.

In some embodiments, the autonomous features module 206 transmits observational log data 122 to the navigation application 199b on the autonomous features server 110. The navigation application 199b may include it owns autonomous features module 206 that uses the observational log data 122 to update a classifier that is used to determine the set of autonomous features including the unsafe autonomous feature. In some embodiments, the classifier is an artificial intelligence algorithm or a machine learning algorithm that is improved based on the recorded driving experiences.

In some embodiments, the autonomous features module 206 uses the observational log to modify the autonomous features. For example, the autonomous features module 206 uses the updated classifier to modify the autonomous features. In some embodiments, the autonomous features module 206 transmits the observational log to the navigation application 199b of the autonomous features server 110. The navigation application 199b of the autonomous features server 110 may receive observational logs from a plurality of vehicles 123 and aggregate the observational logs to determine how to modify the autonomous features. The autonomous features module 206 may continue to modify the classifier based on continual observational log data 122 received from multiple vehicles 123.

The autonomous features module 206 may generate an improvement for an autonomous feature based on the observational log. The observational log may include observations of how drivers use the autonomous features that may be used to generate the improvement. For example, the observational log may indicate that the adaptive cruise control works poorly when the vehicle 123 is within a certain distance from another vehicle. As a result, the autonomous features module 206 may determine that the adaptive cruise control should be improved by requiring that the vehicle 123 maintain a certain distance between itself and the other vehicle. The observational log may be useful when the autonomous feature module 206 introduced a new autonomous feature because the observational log includes details about real-world testing of the new autonomous feature. The autonomous features module 206 may also identify a new autonomous feature that fits an existing need that is identifiable from the observational log. In some embodiments, the autonomous feature module 206 may identify areas for further research based on the observational log.

The autonomous feature module 206 may identify a need for a software patch for an autonomous feature based on the observational log. The observational log may include data that the autonomous feature module 206 uses to identify a dangerous problem with the autonomous feature that can be fixed with an emergency software patch. For example, the observational log may include information about the failure of an autonomous feature and the autonomous feature module 206 may identify, based on the failure, a way to fix the problem using the software patch. As a result, the autonomous feature module 206 fixes a safety problem that would otherwise go undetected without the user of the observational log.

The autonomous feature module 206 may determine that an autonomous feature should be discontinued based on the observational log. In some embodiments, the autonomous feature module 206 determines that the driver consistently disengages an autonomous feature and determines that the autonomous feature should be discontinued based on lack of driver interest. In another example, the autonomous feature module 206 determines that the driver consistently disengages the autonomous feature during the journey and that the autonomous feature should be discontinued based on a potential safety problem associated with the autonomous feature. In some embodiments, the autonomous feature module 206 makes the determination based on a threshold number of times that the driver disengages the autonomous feature or responsive to a disengagement percentage exceeding a threshold percentage level. For example, if the driver disengages the autonomous feature ten times or 95% of the time, the autonomous feature module 206 may determine that the autonomous feature should be discontinued. The autonomous feature module 206 may make the determination based on actions associated with a particular vehicle 123, as described above, or based on aggregate driver actions. For example, autonomous feature module 206 may discontinue an autonomous feature from all vehicles 123 based on 95% of the drivers consistently disengaging the autonomous feature.

The user interface module 208 can be software including routines for generating graphical data for displaying a user interface. In some embodiments, the user interface module 208 can be stored in the memory 127 of the computer system 200 and can be accessible and executable by the processor 125. The user interface module 208 may be adapted for cooperation and communication with the processor 125 and other components of the computer system 200 via signal line 228.

In some embodiments, the user interface module 208 generates graphical data for displaying a user interface for a user, such as a driver of the vehicle 123. The user interface module 208 may receive instructions for generating the user interface from the other modules. For example, the navigation module 204 may instruct the user interface module 208 to generate a user interface where the user may input a start point and an end point of a journey. The autonomous features module 206 may instruct the user interface module 208 to generate a user interface module with candidate navigation routes that correspond to the start point and the end point of the journey with corresponding autonomous features.

Example Methods

Figure 6:
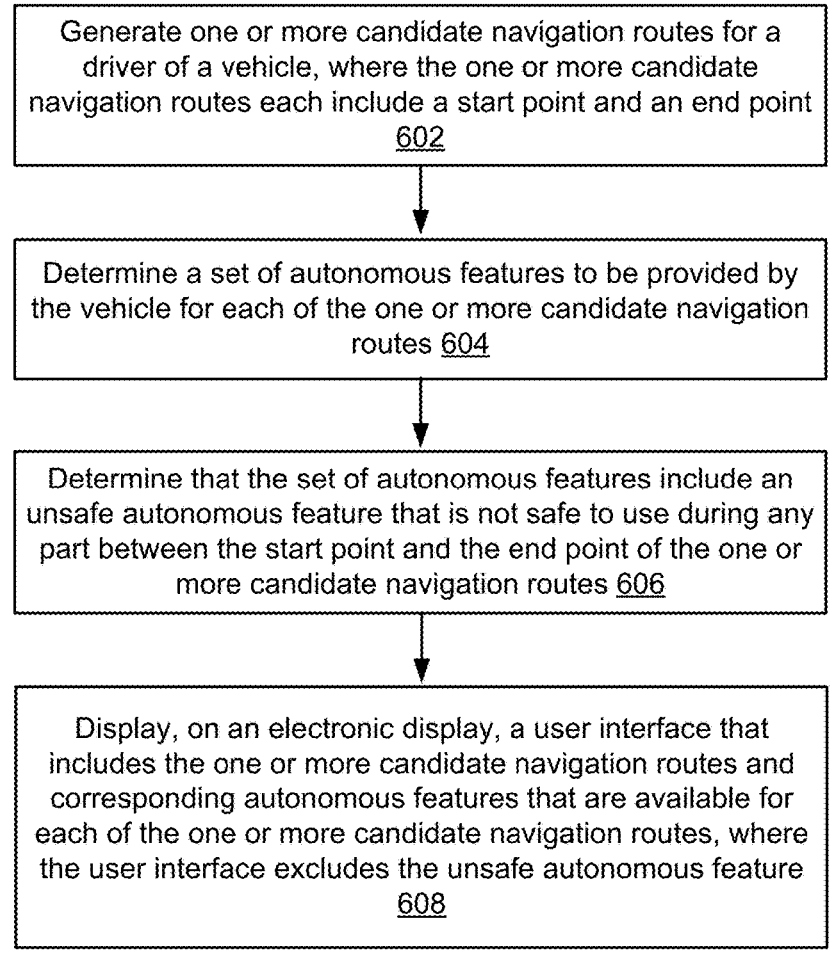
FIG. 6 is a flowchart of an example method for determining autonomous features for candidate navigation routes.

Referring now to FIG. 6, depicted is a method 600 for minimizing radar interference according to some embodiments. One or more of the steps described herein for the method 600 may be executed by the navigation application 199a of the vehicle in FIG. 1, the navigation application 199b of the autonomous features server 110, or a combination of the navigation application 199a of the vehicle in FIG. 1 and the navigation application 199b of the autonomous features server 110. The method 600 may also be executed by the computer system 200 of FIG. 2.

At step 602, one or more candidate navigation routes are generated for a vehicle 123, where the one or more candidate navigation routes each include a start point and an end point.

At step 604, a set of autonomous features to be provided by the vehicle 123 for each of the one or more candidate navigation routes are determined.

At step 606, the set of autonomous features are determined to include an unsafe autonomous feature that is not safe to use during any part between the start point and the end point of the one or more candidate navigation routes.

At step 608, a user interface is displayed on an electronic display 150 that includes the one or more candidate navigation routes and corresponding autonomous features that are available for each of the one or more candidate navigation routes, where the user interface excludes the unsafe autonomous features.

Figure 7:
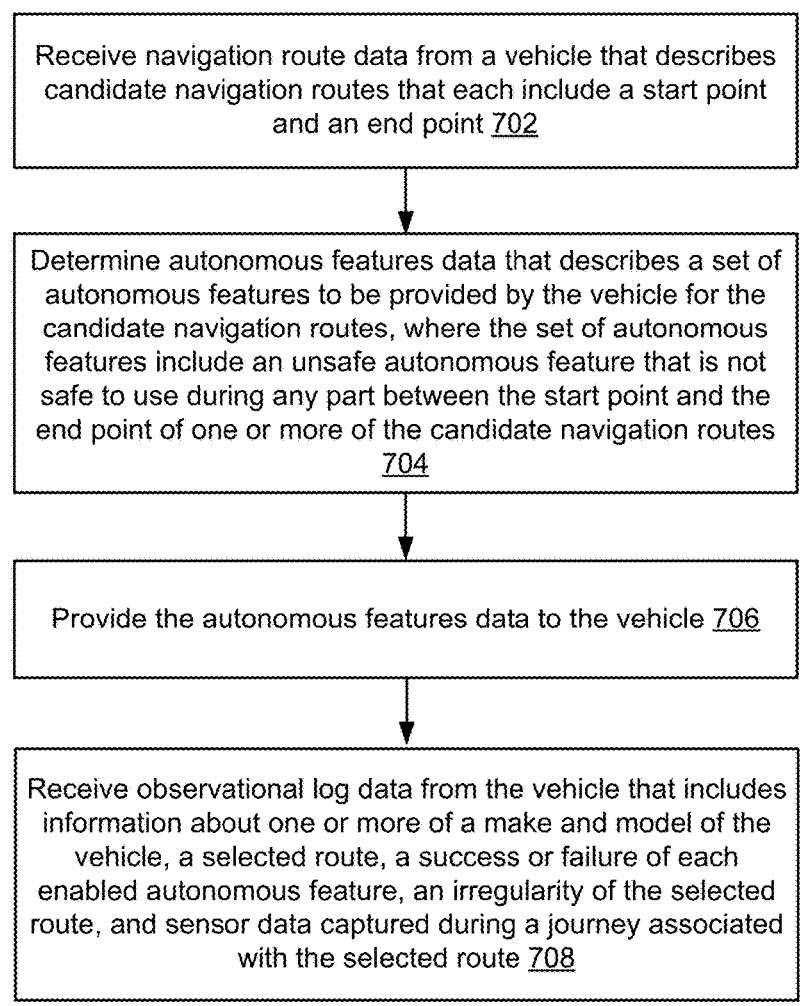
FIG. 7 is a flowchart of an example method for determining autonomous features data and receiving observational log data.

FIG. 7 is a flowchart of an example method for determining autonomous features data 121 and receiving observational log data 122. One or more of the steps described herein for the method 700 may be executed by the navigation application 199b of the autonomous features server 110. The method 700 may also be executed by the computer system 200 of FIG. 2.

At step 702, navigation route data 118 is received from a vehicle 123 that describes candidate navigation routes that each include a start point and an end point. At step 704, autonomous features data 121 is determined that describes a set of autonomous features to be provided by the vehicle for the candidate navigation routes, where the set of autonomous features include an unsafe autonomous feature that is not safe to use during any part between the start point and the end point of one or more of the candidate navigation routes. At step 706, the autonomous features data 121 is provided to the vehicle 123. At step 708, observational log data 122 is received from the vehicle 123 that includes information about one or more of a make and model of the vehicle 123, a selected route, a success or failure of each enabled autonomous feature, an irregularity of the selected route, and sensor data captured during a journey associated with the selected route.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including universal serial bus (USB) keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   generating one or more candidate navigation routes for a driver of a vehicle, wherein the one or more candidate navigation routes each include a start point and an end point;
   determining a set of autonomous features to be provided by the vehicle for each of the one or more candidate navigation routes;
   determining that the set of autonomous features includes an unsafe autonomous feature that is not safe to use during any part between the start point and the end point of the one or more candidate navigation routes; and displaying, on an electronic display, a user interface that includes the one or more candidate navigation routes and corresponding autonomous features that are available for each of the one or more candidate navigation routes, wherein the user interface excludes the unsafe autonomous feature.

2. The method of claim 1, wherein determining that the set of autonomous features includes the unsafe autonomous feature further comprises:

identifying real-time data for conditions that occur along each of the one or more candidate navigation routes; and determining that the unsafe autonomous feature is unsafe for the one or more candidate navigation routes based on the real-time data.

3. The method of claim 2, wherein:

the one or more candidate navigation routes include a first candidate navigation route and a second candidate navigation route;

determining that the unsafe autonomous feature is unsafe for the second candidate navigation route based on the real-time data for the second candidate navigation route; and the user interface includes (1) the first candidate navigation route associated with the set of autonomous features and (2) the second candidate navigation route associated with a subset of the set of autonomous features that excludes the unsafe autonomous feature.

4. The method of claim 1, further comprising:

receiving a selected route that is selected from one or more candidate navigation routes; and during a journey that corresponds to the selected route:
engaging the corresponding autonomous features that are safe to use during the journey; and
generating an observational log that includes information about one or more of the selected route, a make and model of the vehicle, an enabled autonomous feature, an irregularity of the selected route, and sensor data captured during the journey.

5. The method of claim 4, wherein the user interface includes an option for disengaging each autonomous feature in the set of autonomous features that are associated with the selected route.

6. The method of claim 4, further comprising:

generating an improvement for an autonomous feature in the set of autonomous features based on the observational log.

7. The method of claim 4, further comprising:

identifying a need for a software patch for an autonomous feature in the set of autonomous features based on the observational log.

8. The method of claim 4, further comprising:

determining that the driver consistently disengages an autonomous feature in the set of autonomous features based on the observational log; and determining that the autonomous feature should be discontinued based on lack of driver interest.

9. The method of claim 4, wherein the set of autonomous features includes a new autonomous feature, the new autonomous feature is determined to be safe based on real-world data indicating optimal travel conditions, and the observational log includes details about real-world testing of the new autonomous feature.

10. The method of claim 1, wherein the user interface includes (1) a map and an estimated travel time for each of the one or more candidate navigation routes and (2) a reason why the unsafe autonomous feature was excluded.

11. The method of claim 1, wherein the vehicle is a highly autonomous vehicle.

12. A system comprising:

an onboard vehicle computer system of a vehicle that includes a non-transitory memory storing computer code which, when executed by the onboard vehicle computer system causes the onboard vehicle computer system to:

generate one or more candidate navigation routes for a driver of the vehicle, wherein the one or more candidate navigation routes each include a start point and an end point;

determine a set of autonomous features to be provided by the vehicle for each of the one or more candidate navigation routes;

determine that the set of autonomous features includes an unsafe autonomous feature that is not safe to use during any part between the start point and the end point of the one or more candidate navigation routes; and display, on an electronic display, a user interface that includes the one or more candidate navigation routes and corresponding autonomous features that are available for each of the one or more candidate navigation routes, wherein the user interface excludes the unsafe autonomous feature.

13. The system of claim 12, further comprising an autonomous features server that generates autonomous features data describing the set of autonomous features, wherein the onboard vehicle computer system determines that the set of autonomous features includes the unsafe autonomous feature based on the autonomous features data.

14. The system of claim 13, wherein:

generating the autonomous features data comprises identifying real-time data for conditions that occur along each of the one or more candidate navigation routes and generating the autonomous features data based on the real-time data.

15. The system of claim 14, wherein:

the one or more candidate navigation routes include a first candidate navigation route and a second candidate navigation route;

determining that the unsafe autonomous feature is unsafe for the second candidate navigation route is based on the real-time data for the second candidate navigation route; and the user interface includes (1) the first candidate navigation route associated with the set of autonomous features and (2) the second candidate navigation route associated with a subset of the set of autonomous features that excludes the unsafe autonomous feature.

16. The system of claim 12, wherein the computer code further causes the onboard vehicle computer system to:

receive a selected route that is selected from one or more candidate navigation routes; and during a journey that corresponds to the selected route:
engage the corresponding autonomous features that are safe to use during the journey; and
generate an observational log that includes information about one or more of the selected route, a make and model of the vehicle, an enabled autonomous feature, an irregularity of the selected route, and sensor data captured during the journey.

17. A non-transitory memory encoded with a computer program, the computer program comprising instructions that, when executed by one or more processors, cause the one or more processors to perform operations comprising:
- generating one or more candidate navigation routes for a driver of a vehicle, wherein the one or more candidate navigation routes each include a start point and an end point;
- determining a set of autonomous features to be provided by the vehicle for each of the one or more candidate navigation routes;
- determining that the set of autonomous features includes an unsafe autonomous feature that is not safe to use during any part between the start point and the end point of the one or more candidate navigation routes; and
- displaying, on an electronic display, a user interface that includes the one or more candidate navigation routes and corresponding autonomous features that are available for each of the one or more candidate navigation routes, wherein the user interface excludes the unsafe autonomous feature.

18. The non-transitory memory of claim 17, wherein determining that the set of autonomous features includes the unsafe autonomous feature further comprises:
- identifying real-time data for conditions that occur along each of the one or more candidate navigation routes; and
- determining that the unsafe autonomous feature is unsafe for the one or more candidate navigation routes based on the real-time data.

19. The non-transitory memory of claim 18, wherein:
- the one or more candidate navigation routes include a first candidate navigation route and a second candidate navigation route;
- determining that the unsafe autonomous feature is unsafe for the second candidate navigation route is based on the real-time data for the second candidate navigation route; and
- the user interface includes (1) the first candidate navigation route associated with the set of autonomous features and (2) the second candidate navigation route associated with a subset of the set of autonomous features that excludes the unsafe autonomous feature.

20. The non-transitory memory of claim 17, further comprising additional instructions stored on the non-transitory memory which, when executed by the one or more processors causes the one or more processors to execute additional operations comprising:
- receiving a selected route that is selected from one or more candidate navigation routes; and
- during a journey that corresponds to the selected route:
  - engaging the corresponding autonomous features that are safe to use during the journey; and
  - generating an observational log that includes information about one or more of the selected route, a make and model of the vehicle, an enabled autonomous feature, an irregularity of the selected route, and sensor data captured during the journey.

21. A method comprising:
- receiving navigation route data from a vehicle that describes candidate navigation routes that each include a start point and an end point;
- determining autonomous features data that describe a set of autonomous features to be provided by the vehicle for the candidate navigation routes, wherein the set of autonomous features includes an unsafe autonomous feature that is not safe to use during any part between the start point and the end point of one or more of the candidate navigation routes;
- providing the autonomous features data to the vehicle; and
- receiving observational log data from the vehicle that includes information about one or more of a make and model of the vehicle, a selected route, a success or failure of each enabled autonomous feature, an irregularity of the selected route, and sensor data captured during a journey associated with the selected route.

22. The method of claim 21, wherein a classifier is used to determine the autonomous features data and further comprising:
- updating the classifier based on the observational log data.

23. The method of claim 21, further comprising:
- receiving real-time data for conditions that occur along each of the candidate navigation routes; and
- wherein determining the autonomous features data is further based on the real-time data and the real-time data includes one or more of weather data, traffic accident data, navigation route data, and construction data.

24. The method of claim 23, wherein:
- the candidate navigation routes include a first candidate navigation route and a second candidate navigation route;
- determining that the unsafe autonomous feature is unsafe for the second candidate navigation route is based on the real-time data for the second candidate navigation route; and
- the vehicle provides a driver of the vehicle with a user interface that includes (1) the first candidate navigation route associated with the set of autonomous features and (2) the second candidate navigation route associated with a subset of the set of autonomous features that excludes the unsafe autonomous feature.

25. The method of claim 21, wherein determining the autonomous features data is based on an autonomous features data structure that includes features data that describe, for each autonomous feature included in the vehicle: (1) each driving scenario that have been certified for using accurate real-world testing; and (2) any driving scenarios that are known to be unsafe or likely to be unsafe.

* * * * *